US011402995B2

(12) United States Patent
Chen et al.

(10) Patent No.: US 11,402,995 B2
(45) Date of Patent: Aug. 2, 2022

(54) DATA STORAGE SYSTEM IN A KEY-VALUE STORAGE ARCHITECTURE WITH DATA COMPRESSION, AND NON-VOLATILE MEMORY CONTROL METHOD

(71) Applicant: Shannon Systems Ltd., Shanghai (CN)

(72) Inventors: Chao Chen, Shanghai (CN); Ningzhong Miao, Shanghai (CN)

(73) Assignee: SHANNON SYSTEMS LTD., Shanghai (CN)

( * ) Notice: Subject to any disclaimer, the term of this patent is extended or adjusted under 35 U.S.C. 154(b) by 0 days.

(21) Appl. No.: 17/163,739

(22) Filed: Feb. 1, 2021

(65) Prior Publication Data

US 2021/0303171 A1 Sep. 30, 2021

(30) Foreign Application Priority Data

Mar. 27, 2020 (CN) .......................... 202010227634.6

(51) Int. Cl.
*G06F 3/06* (2006.01)

(52) U.S. Cl.
CPC ............ *G06F 3/0608* (2013.01); *G06F 3/064* (2013.01); *G06F 3/0653* (2013.01); *G06F 3/0659* (2013.01); *G06F 3/0688* (2013.01)

(58) Field of Classification Search
CPC ...... G06F 3/0608; G06F 3/0634; G06F 3/064; G06F 3/0653; G06F 3/0659; G06F 3/0679; G06F 3/0688
See application file for complete search history.

(56) References Cited

U.S. PATENT DOCUMENTS

| | | | |
|---|---|---|---|
| 8,169,825 B1 * | 5/2012 | Shalvi | G11C 11/56 365/185.09 |
| 10,521,399 B1 * | 12/2019 | Ben-Tsion | G06F 16/1744 |
| 10,732,884 B1 * | 8/2020 | Gupta | G06F 3/0604 |
| 2016/0196207 A1 * | 7/2016 | Gupta | G06F 12/0246 711/103 |
| 2019/0102232 A1 * | 4/2019 | Wang | G06F 21/602 |

* cited by examiner

*Primary Examiner* — Larry T MacKall
(74) *Attorney, Agent, or Firm* — McClure, Qualey & Rodack, LLP

(57) ABSTRACT

A key-value storage architecture with data compression is shown. A computing unit is configured to estimate the average compression rate factor of a non-volatile memory. The computing unit is further configured to estimate storage space consumption of the non-volatile memory based on the average compression rate factor, and programming of the non-volatile memory is prohibited if to the storage space consumption exceeds a predefined threshold. The average compression rate factor is dynamically updated, and is a weighted result of compression rate factors of several storage units of the non-volatile memory.

20 Claims, 4 Drawing Sheets

DATA STORAGE SYSTEM IN A KEY-VALUE STORAGE ARCHITECTURE WITH DATA COMPRESSION, AND NON-VOLATILE MEMORY CONTROL METHOD

CROSS REFERENCE TO RELATED APPLICATIONS

This application claims the priority of China Patent Application No. 202010227634.6, filed on Mar. 27, 2020, the entirety of which is incorporated by reference herein.

BACKGROUND OF THE INVENTION

Field of the Invention

The present invention relates to the control of non-volatile memory, and in particular it relates to data compression in key-value storage architecture.

Description of the Related Art

There are various forms of non-volatile memory (NVM) for long-term data storage, such as flash memory, magnetoresistive random access memory (magnetoresistive RAM), ferroelectric RAM, resistive RAM, spin transfer torque-RAM (STT-RAM), and so on. These types of non-volatile memory may be used as the storage medium in a data storage device.

Each non-volatile memory has its own special storage characteristics, so that special designs are required to operate and manage the various non-volatile memories.

BRIEF SUMMARY OF THE INVENTION

An improved technology is applied to a key-value storage architecture in the present invention. In the key-value storage architecture, data compression can be performed in background to optimize data storage space. A capacity estimation technology of the non-volatile memory is proposed in the present invention.

A data storage device in accordance with an exemplary embodiment of the present invention includes a non-volatile memory and a computing unit. The computing unit is coupled to the non-volatile memory, and is configured to estimate the average compression rate factor of the non-volatile memory as key-value data is programmed into the non-volatile memory. The computing unit is further configured to estimate storage space consumption of the non-volatile memory based on the average compression rate factor, and programming of the non-volatile memory is prohibited if the storage space consumption exceeds a predefined threshold. The average compression rate factor is dynamically updated, and is a weighted result of compression rate factors of several storage units of the non-volatile memory.

In an exemplary embodiment, the non-volatile memory is a flash memory. The computing unit compresses key-value data to a plurality of cold super blocks of the flash memory. The computing unit estimates a compression rate factor for each cold super block for estimation of the average compression rate factor.

In an exemplary embodiment, the computing unit performs a calculation:

$$cr\_factor = total\_sb\_space/total\_kv\_size,$$

where cr_factor is a compression rate factor of a cold super block, total_sb_space is a rated capacity of the cold super block, and total_kv_size is an uncompressed size of all valid and invalid pieces of key-value data in the cold super block.

In an exemplary embodiment, the computing unit performs a calculation:

$$kv\_size = len(prefix) + len(key) + len(value) + len(mark),$$

where: kv_size is the uncompressed size of a piece of key-value data; the length of a prefix recorded in the piece of key-value data is len(prefix); the length of a key recorded in the piece of key-value data is len(key); the length of a responding value recorded in the piece of key-value data is len(value); and the length of a mark recorded in the piece of key-value data is len(mark).

In an exemplary embodiment, the computing unit performs a calculation:

$$ave\_cr\_factor(new) = a * ave\_cr\_factor(old) + (1-a) * cr\_factor(new),$$

where: ave_cr_factor(new) is the current version of the average compression rate factor; ave_cr_factor(old) is the previous version of the average compression rate factor; cr_factor(new) is the compression rate factor of the latest cold super block; and a is a weighting factor.

In an exemplary embodiment, the computing unit sets the initial value of the average compression rate factor based on the specified value of compression rate factor of a data compression algorithm applied to the non-volatile memory. In another exemplary embodiment, the computing unit sets the initial value of the average compression rate factor as the compression rate factor of a starting cold super block.

In an exemplary embodiment, the computing unit programs key-value data to a plurality of hot super blocks and then compresses the key-value data from the hot super blocks to the cold super blocks. The computing unit estimates, for each cold super block and each hot super block, the uncompressed size of valid pieces of key-value data. Based on the uncompressed size of valid pieces of key-value data in each of the cold super blocks and the hot super blocks, the average compression rate factor, and the compression rate factor of each of the cold super blocks, the computing unit estimates the storage space consumption.

In an exemplary embodiment, the computing unit performs a calculation:

$$estimate\_hot\_disk\_usage = (valid\_kv\_size[h\_1] + valid\_kv\_size[h\_2] + \ldots + valid\_kv\_size[h\_n]) * ave\_cr\_factor; \text{ and}$$

$$estimate\_cold\_disk\_usage = valid\_kv\_size[c\_1] * cr\_factor[c\_1] + valid\_kv\_size[c\_2] * cr\_factor[c\_2] + \ldots + valid\_kv\_size[c\_m] * cr\_factor[c\_m],$$

where: estimate_hot_disk_usage is the first compressed size that corresponds to a hot space in the non-volatile memory which includes the hot super blocks; $h\_1, h\_2 \ldots h\_n$ are the hot super blocks of the non-volatile memory, and uncompressed size of valid pieces of key-value data within $h\_1, h\_2 \ldots h\_n$ is valid_kv_size[h_1], valid_kv_size[h_2] ... valid_kv_size[h_n]; estimate_cold_disk_usage is the second compressed size that corresponds to a cold space in the non-volatile memory which includes the cold super blocks; and $c\_1, c\_2 \ldots c\_m$ are the cold super blocks of the non-volatile memory, uncompressed size of valid pieces of key-value data within $c\_1, c\_2 \ldots c\_m$ is valid_kv_size[c_1], valid_kv_size[c_2] ... valid_kv_size[c_m], and compression rate factors of $c\_1, c\_2 \ldots c\_m$ are cr_factor[c_1], cr_factor[c_2] ... cr_factor[c_m].

In an exemplary embodiment, the computing unit performs a calculation:

estimate_disk_usage=estimate_hot_disk_usage+estimate_cold_disk_usage, where estimate_disk_usage is the storage space consumption.

In an exemplary embodiment, the computing unit is within a host, which operates the non-volatile memory provided on a device end through a controller at the device end. In another exemplary embodiment, the non-volatile memory is provided at a device end. The computing unit is a controller at the device end. The controller operates the non-volatile memory in response to requests issued by a host.

The forgoing controller operating the non-volatile memory may be implemented in other structures. In an exemplary embodiment, a control method for non-volatile memory with the aforementioned concept is proposed.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows exemplary embodiments of carrying out the invention. This description is made for the purpose of illustrating the general principles of the invention and should not be taken in a limiting sense. The scope of the invention is best determined by reference to the appended claims.

A non-volatile memory for long-term data retention may be a flash memory, a magnetoresistive random access memory (magnetoresistive RAM), a ferroelectric RAM, a resistive RAM, a spin transfer torque-RAM (STT-RAM) and so on. The following discussion uses flash memory as an example.

Today's data storage devices often use flash memory as the storage medium for storing user data from the host. There are many types of data storage devices, including memory cards, universal serial bus (USB) flash devices, solid-state drives (SSDs), and so on. In another exemplary embodiment, a flash memory may be packaged with a controller to form a multiple-chip package called an eMNIC (embedded multimedia card).

A data storage device using a flash memory as a storage medium can be applied in a variety of electronic devices, including a smartphone, a wearable device, a tablet computer, a virtual reality device, etc. A calculation module of an electronic device may be regarded as a host that operates the data storage device equipped on the electronic device to access the flash memory within the data storage device.

A data center may be built with data storage devices using flash memories as the storage medium. For example, a server may operate an array of SSDs to form a data center. The server may be regarded as a host that operates the SSDs to access the flash memories within the SSDs.

The flash memory has its own special storage characteristics, which are described below.

Figure 1:
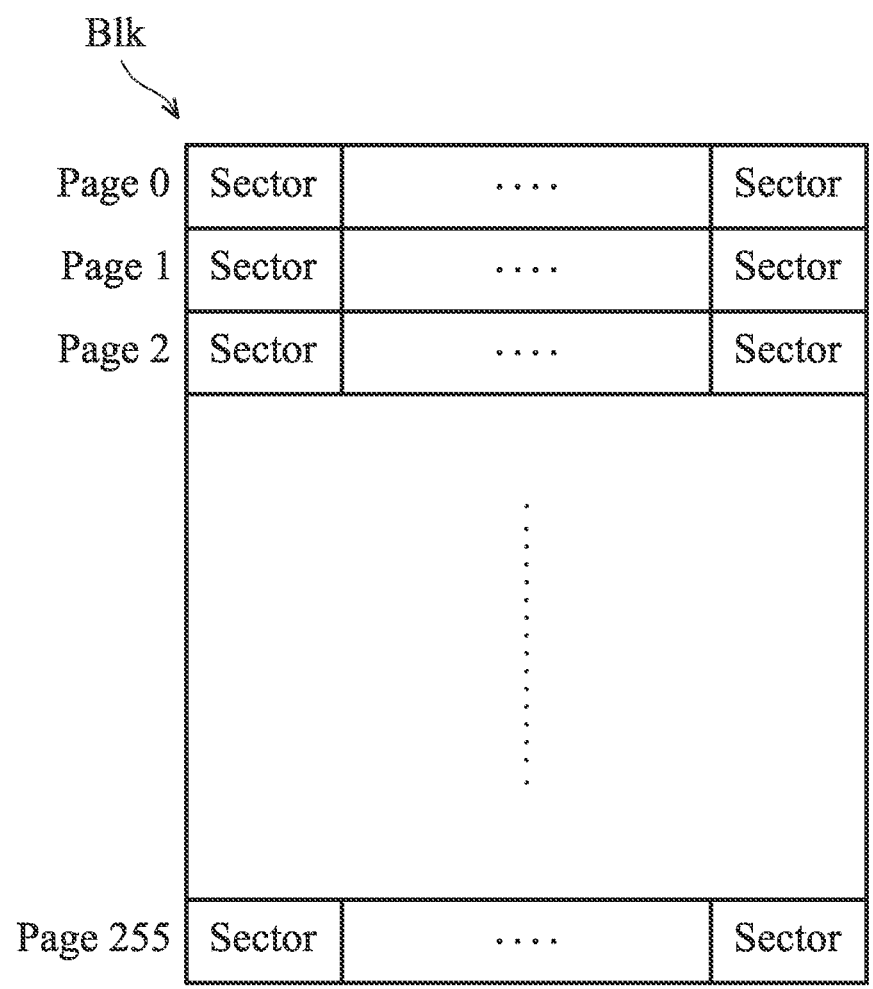
FIG. 1 illustrates the structure of a block Blk of a flash memory.

The physical space of flash memory is divided into a plurality of blocks to be allocated for storage of data. FIG. 1 illustrates the structure of a block Blk of a flash memory. Each block Blk includes a plurality of pages, for example, page 0 . . . page 255. Each page includes a plurality of sectors, such as 32 sectors. Each sector can store 512B of user data. In an exemplary embodiment, data is programmed into one block from the lower page number to the higher page number. In some exemplary embodiments, the flash memory is accessed through multiple channels. The blocks accessed in parallel through the multiple channels are treated as a super block, and the pages accessed in parallel through the multiple channels are treated as a super page. Data is programmed into one super block from the lower numbered super page to the higher numbered super page. The multi-channel architecture can improve data throughput. The following examples can all be applied in the multi-channel architecture.

Especially, in flash memory, the updated data is not overwritten to the storage space of the old data. The updated data must be programmed into a blank space, and the old data is invalidated. An erasure operation (in units of blocks) is required to release the invalidated space. When the spare blocks are gradually consumed to be less than a threshold amount, there is a demand for garbage collection. The valid data in a source block are collected to a spare space through garbage collection. The source block with only invalid data remained, therefore, can be released and used again after the erasure operation. Storage space is released by garbage collection to ensure the normal use of flash memory.

The present invention proposes a data compression technology to be applied to a data storage device that is in key-value storage architecture. In the key-value storage architecture, each piece of key-value data includes a key and a responding value. The key preferably has a fixed length, for example, 32 bytes. Each key corresponds to a responding value whose length is preferably not fixed. The host can output a write command to program a key and its responding value to a data storage device based on a key-value storage technology. The data storage device, for example, is a key-value SSD. After that, the host can issue a read command that issues a key to read the flash memory and thereby a responding value corresponding to the key is read from the flash memory. In addition, the data storage device may perform data compression during garbage collection. Data compression can maximize data storage capacity of the data storage device. The present invention involves storage capacity estimation of data storage device.

Figure 2:
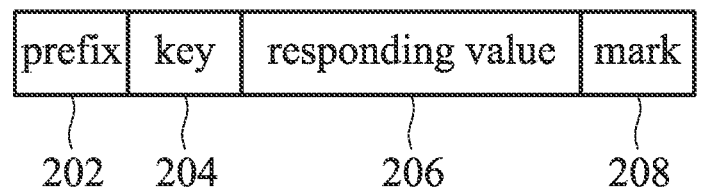
FIG. 2 illustrates a key-value format 200 in accordance with an exemplary embodiment of the present invention.

FIG. 2 illustrates a key-value format 200 in accordance with an exemplary embodiment of the present invention, which includes a prefix field 202, a key field 204, a responding-value field 206, and a mark field 208. The prefix field 202 may have a fixed length, for example, 16 bytes. The length or the format code of the key-value format 200 may be recorded in the prefix field 202. The key representing the key-value data KV is stored in the key field 204, and the responding value corresponding to the key is stored in the responding-value field 206. The mark field 208 may have a fixed length, such as 1 byte.

Figure 3:
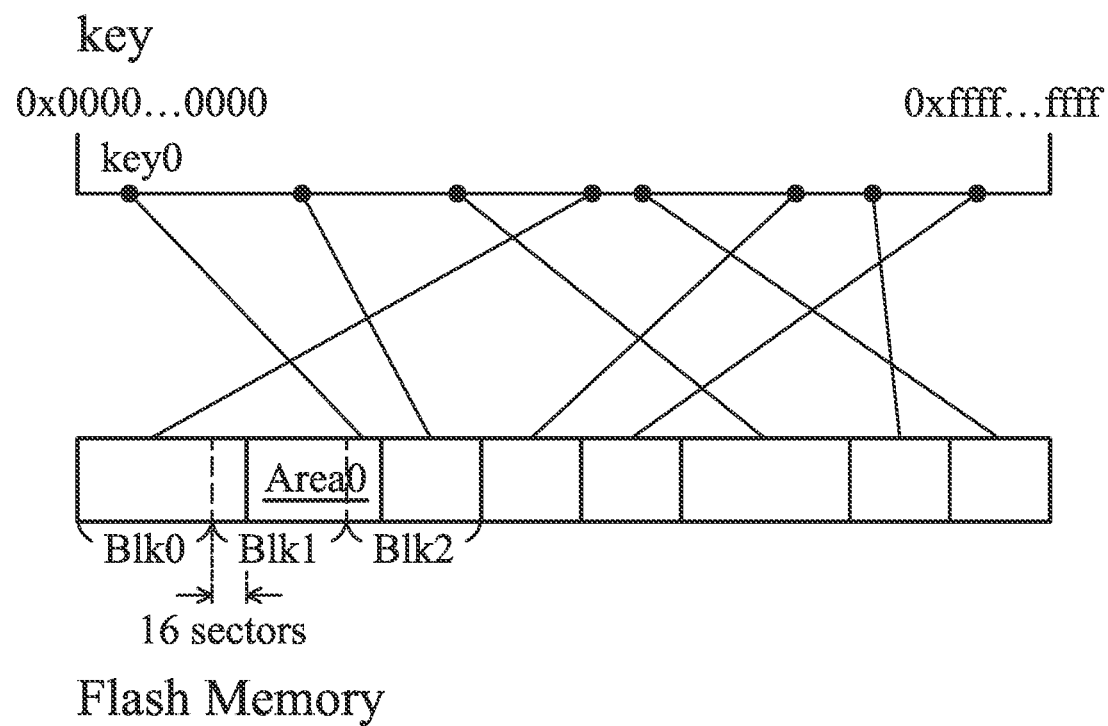
FIG. 3 illustrates how the keys map to the physical space of flash memory.

FIG. 3 illustrates how the keys map to the physical space of flash memory. A flash translation layer (FTL) needs to be established in the data storage device or at the host side according to the key-value storage architecture. In the flash translation layer, a key-value mapping table (storing mapping information) is dynamically updated to map the different keys to the different areas of the flash memory. The key-value mapping table is searched according to the key requested by the host. According to the requested key, mapping information is read from the key-value mapping table. For each piece of key-value data, the mapping information recorded in the key-value mapping table preferably indicates a starting block and records an offset. As shown, a key, key0, is mapped to a flash area, Area0, that starts from a block, Blk1, with an offset of 4096 bytes (i.e., an offset of 16 sectors). The flash area Area0 is partially provided by block Blk1 and partially provided by block Blk2.

The controller in the data storage device may compress the collected valid data during garbage collection. The compressed valid data is copied to a spare space, and thereby the block (or a supper block) storing old data can be released. The compressed valid data still follows the key-value format 200, and the mapping information of the compressed valid data is updated to the flash translation layer (FTL).

After data compression, the data storage space of the data storage device is increased relatively. In an exemplary embodiment, a rated capacity of a data storage device is 800G. A user wants to program 900G key-value data to the data storage device, but only 100G key-value data can be compressed to 50G by a general data compression technology. There is still 50G key-value data cannot be programmed into the data storage device. In such a situation, garbage collection with data compression is a solution. The 900G key-value data may be compressed to 450G by garbage collection with data compression. There is still 350G free space in the data storage device. For a data storage device with data compression performed during garbage collection, an estimation technology is proposed in the present invention to correctly estimate the storage space consumption.

In an exemplary embodiment, a compression rate factor cr_factor is introduced to estimate the storage space consumption.

In an exemplary embodiment, the controller of the data storage device programs key-value data issued by the host to a hot super block. The key-value data in the hot super block can be compressed into a cold super block by garbage collection. The controller may estimate the compression rate factor cr_factor of the cold super block according to the following equation:

cr_factor=total_sb_space/total_kv_size where, the size of storage space provided by the cold super block is total_sb_space, and the uncompressed size of all key-value data (no matter it's valid or invalid) stored in the cold super block is total_kv_size. In this example, the compression rate factor cr_factor is the inverse of compression rate. In an exemplary embodiment, in the key-value format 200, the uncompressed size of key-value data KV1 is calculated by the following equation:

kv1_size=len(prefix)+len(key)+len(value)+len(mark)

where, len(prefix) is the length of the prefix 202 of the key-value data KV1, len(key) is the length of the key 204 of the key-value data KV1, len(value) is the length of the responding value 206 of the key-value data KV1, and len(mark) is the length of the mark 208 of the key-value data KV1.

In a cold super block, the length of the different pieces of key-value data may be different (non-fixed). After calculation of the length of each piece of key-value data (no matter its valid or invalid data) and summing them up, uncompressed size total_kv_size of all key-value data in the cold super block and the compression rate factor cr_factor of the cold super block are estimated and recorded in the final 4 KB space of the cold super block. In some exemplary embodiments, the compression rate factor cr_factor is stored in a specific space of the cold super block with the total size, total_sb_space, of storage space provided by the cold super block.

In an exemplary embodiment, the rated capacity of a cold super block is 1 GB uncompressed key-value data, and 1024*1024 pieces of 4 KB key-value data (whether it's valid or invalid) is really stored in the cold super block. In such an example, total_sb_space is 1 GB, and total_kv_size is 1024*1024*4 KB (that is, 4 GB). The compression rate factor cr_factor of the cold super block is calculated from dividing 1 GB by 4 GB, which is 0.25.

In an exemplary embodiment, the computing unit dynamically updates an average compression rate factor ave_cr_factor during the programming of the cold super blocks. The calculation is:

ave_cr_factor(new)=$a$*ave_cr_factor(old)+(1−$a$)*cr_factor(new)

where ave_cr_factor is average compression rate factor. The current version of average compression rate factor ave_cr_factor(new) is calculated from the previous version of average compression rate factor ave_cr_factor(old) and a compression rate factor cr_factor(new) of a cold super block that is newly closed. There is a weighting factor, a, and 0≤a≤1. The weighting factor, a, can be set according to experience. In an exemplary embodiment, more weight is assigned to the new information. For example, the weighting factor, a, may be greater than 0.5.

In this exemplary embodiment, the average compression rate factor ave_cr_factor is dynamically updated with the programming of the flash memory, and is a weighted result of the compression rate factor cr_factor of every cold super block in the flash memory.

There are many options to the initial value of the average compression rate factor ave_cr_factor. In an exemplary embodiment, based on a specified compression rate of the selected compression algorithm, an expected compression rate factor is estimated. The expected compression rate factor may be directly used as the initial value of the average compression rate factor ave_cr_factor. In some exemplary embodiments, the expected compression rate factor is slightly adjusted before being used as the initial value of the average compression rate factor ave_cr_factor. In another exemplary embodiment, the compression rate factor cr_factor of the first cold super block is used as the initial value of the average compression rate factor ave_cr_factor. In another exemplary embodiment, the initial value of the average compression rate factor ave_cr_factor depends on the product application scenario.

In an exemplary embodiment, the initial value of the average compression rate factor ave_cr_factor is 0.5, and the weighting factor, a, is 0.6. The related discussion is presented in the following paragraphs.

When the compression rate factor cr_factor of the first cold super block is 0.25, the average compression rate factor ave_cr_factor is updated to 0.6*0.5±(1−0.6)*0.25, which is 0.4.

When the compression rate factor cr_factor of the second cold super block is 0.25, the average compression rate factor ave_cr_factor is updated to 0.6*0.4+(1−0.6)*0.25, which is 0.34.

When the compression rate factor cr_factor of the third cold super block is 0.25, the average compression rate factor ave_cr_factor is updated to 0.6*0.34+(1−0.6)*0.25, which is 0.3.

When the compression rate factor cr_factor of the fourth cold super block is 0.5, the average compression rate factor ave_cr_factor is updated to 0.6*0.30+(1−0.6)*0.5, which is 0.38.

Based on the same compression rate factor, 0.25 (cr_factor), of the first to the third cold super blocks, the average compression rate factor ave_cr_factor is steadily approaching 0.25 (0.5→0.4→0.34→0.3). Even if the compression rate factor cr_factor of the fourth cold super block suddenly rises to 0.5, the average compression rate factor ave_cr_factor does not overly deviate from the previous version (0.3). The ave_cr_factor is just slightly changed from 0.3 to 0.38. The credibility of the dynamically updated average compression rate factor ave_cr_factor is quite high. The estimation of storage space consumption based on the average compression rate factor ave_cr_factor is described as follows.

In an exemplary embodiment, the computing unit estimates valid_kv_size, which is the uncompressed size of all valid pieces of key-value data in each super block. If all key-value data in a super block are valid, valid_kv_size is equal to the uncompressed size of all key-value data total_kv_size. If there is a piece of invalid key-value data KV1 (whose uncompressed size is kv1_size), valid_kv_size is total_kv_size minus kv1_size.

Taking a hot space including hot super blocks h_1, h_2 ... h_n as an example, the computing unit estimates the first compressed size, estimate_hot_disk_usage, which is:

$$\text{estimate\_hot\_disk\_usage} = (\text{valid\_kv\_size}[h\_1] + \text{valid\_kv\_size}[h\_2] + \ldots + \text{valid\_kv\_size}[h\_n]) * \text{ave\_cr\_factor}$$

Taking a cold space including cold super blocks c_1, c_2 ... c_m as an example, the computing unit estimates the second compressed size, estimate_cold_disk_usage, which is:

$$\text{estimate\_cold\_disk\_usage} = \text{valid\_kv\_size}[c\_1] * \text{cr\_factor}[c\_1] + \text{valid\_kv\_size}[c\_2] * \text{cr\_factor}[c\_2] + \ldots + \text{valid\_kv\_size}[c\_m] * \text{cr\_factor}[c\_m]$$

The computing unit further adds the first compressed size estimate_hot_disk_usage to the second compressed size estimate_cold_disk_usage to obtain the storage space consumption estimate_disk_usage of the non-volatile memory, which is calculated as follows:

$$\text{estimate\_disk\_usage} = \text{estimate\_hot\_disk\_usage} + \text{estimate\_cold\_disk\_usage}$$

By comparing the storage space consumption estimate_disk_usage with the rated capacity disk_usage of the flash memory, it is determined whether to prohibit the programming of the flash memory.

In an exemplary embodiment, it is determined that the flash memory still have a lot of spare space for data storage when the storage space consumption estimate_disk_usage is less than the rated capacity disk_usage at by at least a critical amount. On the contrary, programming to the flash memory is prohibited.

Figure 4:
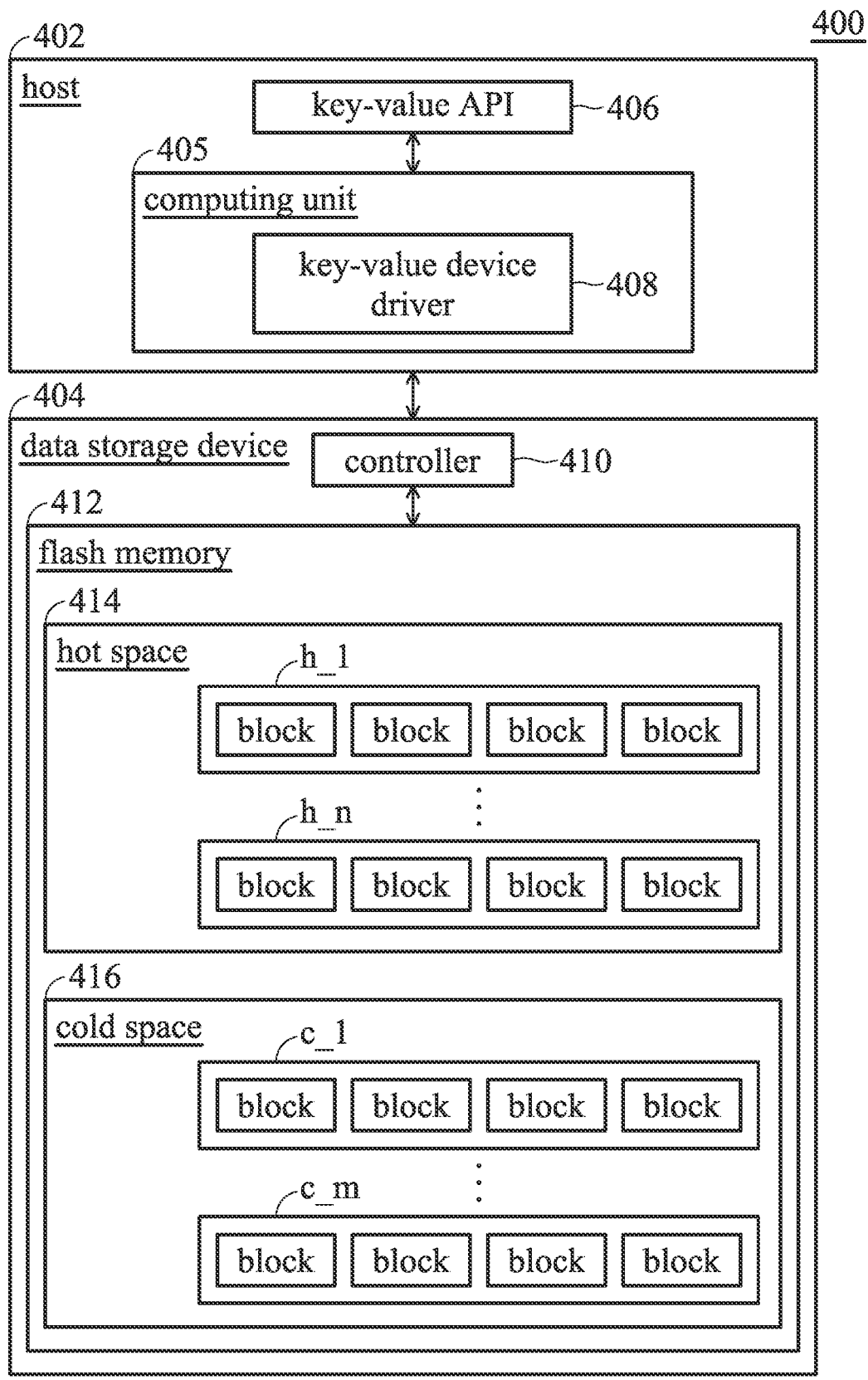
FIG. 4 is a block diagram illustrating a data storage system 400 in accordance with an exemplary embodiment of the present invention.

FIG. 4 is a block diagram illustrating a data storage system 400 in accordance with an exemplary embodiment of the present invention, which includes a host 402 and a data storage device 404. A key-value application programming interface (key-value API) 406 is established at the host 402 side to communicate with users. The computing unit 405 in the host 402 may run a key-value device driver 408. In response to the requests that the user enters through the key-value API 406, the key-value device driver 408 drives the data storage device 404 to operate the flash memory 412 through the controller 410 at the device end.

The data issued by the host 402 is first programmed into hot super blocks, like h_1 ... h_n which form a hot space 414. When the user stops sending a request to access the flash memory 412 through the key-value API 406, the key-value device driver 408 may perform garbage collection with data compression in background, and thereby the valid key-value data in the hot space 414 is compressed and programmed into a cold space 416. The key-value device driver 408 monitors the flash memory 412. The monitored information includes: valid_kv_size[h_1] ... valid_kv_size[h_n], the uncompressed size of valid pieces of key-value data in the different hot super blocks h_1 ... h_n; valid_kv_size[c_1] ... valid_kv_size[c_m], the uncompressed size of valid pieces of key-value data in the different cold super blocks c_1 ... c_m; cr_factor[c_1] ... cr_factor[c_m], the compression rate factors of the cold super blocks c_1 ... c_m; and ave_cr_factor, the average rate factor of the entire flash memory 412.

Based on the collected information, the key-value device driver 408 estimates the storage space consumption estimate_disk_usage of the flash memory 412, and determines whether to stop the programming function of the data storage device 404.

The forgoing garbage collection with data compression and/or compressed result estimation may be realized in various hardware architectures, and are not limited to be realized by the computing unit 405 operating the key-value device driver 408 at the host 402 side. In another exemplary embodiment, the forgoing garbage collection with data compression and/or compressed result estimation is realized by a processor within a controller 410 of the data storage device 404. In another exemplary embodiment, both the host 402 and the data storage device 404 provide hardware for the forgoing garbage collection with data compression and/or compressed result estimation.

Figure 5:
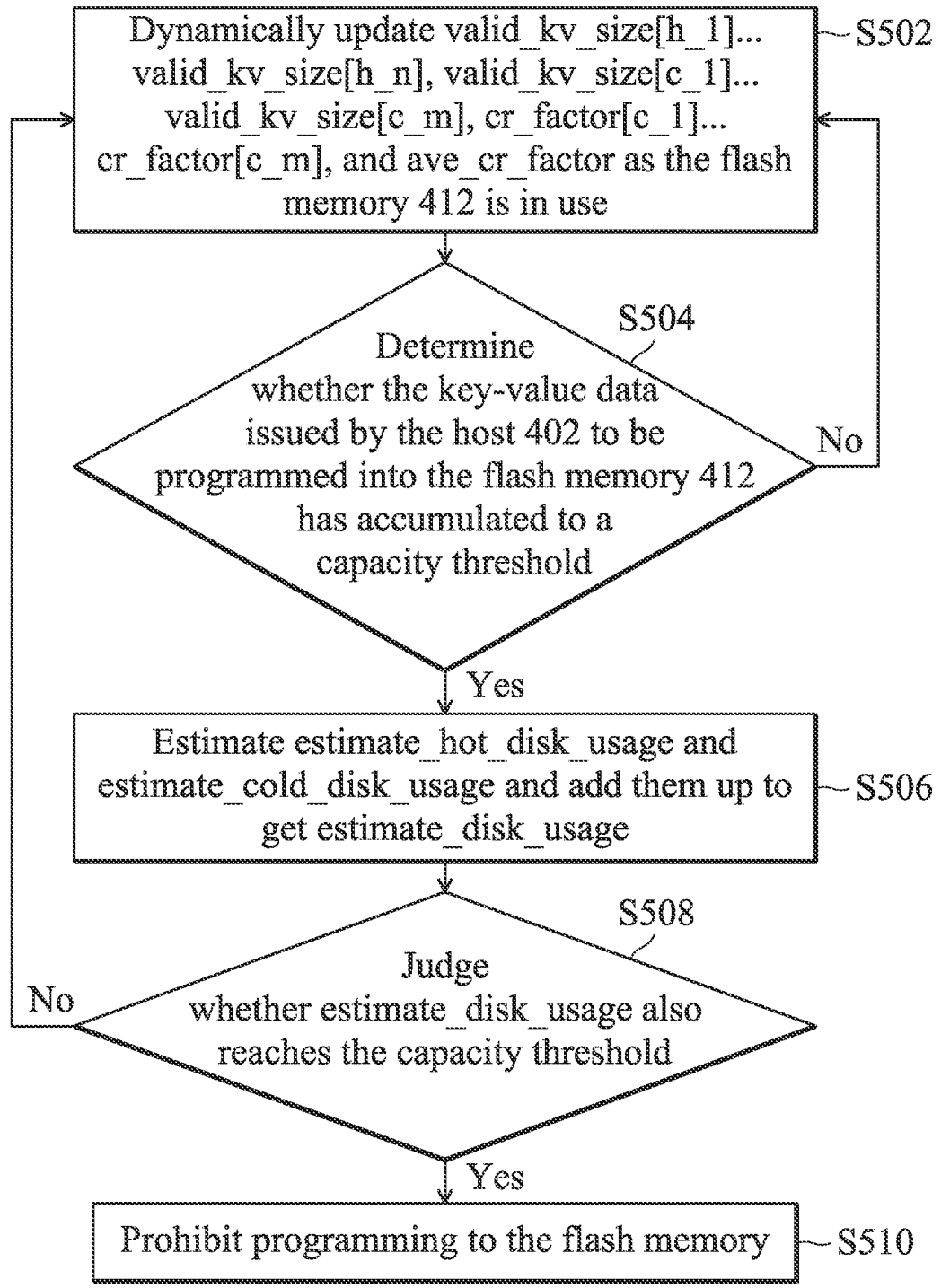
FIG. 5 is a flowchart illustrating the estimation of the storage space consumption, which may be realized by the key-value device driver 408 or/and the controller 410.

FIG. 5 is a flowchart illustrating the estimation of the storage space consumption, which may be realized by the key-value device driver 408 or/and the controller 410.

In step S502, information, including valid_kv_size[h_1] ... valid_kv_size[h_n], valid_kv_size[c_1] ... valid_kv_size[c_m], cr_factor[c_1] ... cr_factor[c_m], and ave_cr_factor, is dynamically updated as the flash memory 412 is in use.

In step S504, it is determined whether the key-value data issued by the host 402 to be programmed into the flash memory 412 has accumulated to a capacity threshold of the flash memory 412. If not, the procedure returns to step S502 for the dynamic update of valid_kv_size[h_1] ... valid_kv_size[h_n], valid_kv_size[c_1] ... valid_kv_size[c_m], cr_factor[c_1] ... cr_factor[c_m], and ave_cr_factor. Otherwise, the procedure proceeds to step S506.

In step S506, the first compressed size estimate_hot_disk_usage and the second compressed size estimate_cold_disk_usage are estimated and added up to get the storage space consumption estimate_disk_usage.

In step S508, it is judged whether the storage space consumption estimate_disk_usage also reaches the capacity threshold of the flash memory 412. If not, the procedure returns to step S502 for the dynamic update of valid_kv_size [h_1] . . . valid_kv_size[h_n], valid_kv_size[c_1] . . . valid_kv_size[c_m], cr_factor[c_1] . . . cr_factor[c_m], and ave_cr_factor. Otherwise, the procedure proceeds to step S510.

In step S510, programming to the flash memory is prohibited. In this manner, it is prevented to program too much data into the flash memory 412. The normal use of the flash memory 412 is guaranteed.

The controller operating the flash memory may be modified in the architecture. Any estimation, based on the aforementioned concept, about storage space consumption of key-value data programming falls within the scope of the present invention. The aforementioned concept may be used to realize non-volatile memory control methods.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage system, comprising:
a non-volatile memory; and
a processor at a host or at a device, coupled to the non-volatile memory, and configured to estimate an average compression rate factor of the non-volatile memory,
wherein:
the processor is further configured to estimate storage space consumption of the non-volatile memory based on the average compression rate factor, and programming of the non-volatile memory is prohibited if the storage space consumption exceeds a predefined threshold;
the average compression rate factor is dynamically updated, and is a weighted result of compression rate factors of several storage units of the non-volatile memory;
the non-volatile memory is a flash memory;
the processor compresses key-value data to a plurality of cold super blocks of the flash memory;
the processor estimates a compression rate factor for each cold super block for estimation of the average compression rate factor.

2. The data storage system as claimed in claim 1, wherein the processor performs a calculation:

cr_factor=total_sb_space/total_kv_size, where cr_factor is a compression rate factor of a cold super block, total_sb_space is a rated capacity of the cold super block, and total_kv_size is an uncompressed size of all valid and invalid pieces of key-value data in the cold super block.

3. The data storage system as claimed in claim 2, wherein the processor performs a calculation:

kv_size=len(prefix)+len(key)+len(value)+len(mark), where:
kv_size is the uncompressed size of a piece of key-value data;
length of a prefix recorded in the piece of key-value data is len(prefix);
length of a key recorded in the piece of key-value data is len(key);
length of a responding value recorded in the piece of key-value data is len(value); and
length of a mark recorded in the piece of key-value data is len(mark).

4. The data storage system as claimed in claim 2, wherein the processor performs a calculation:

ave_cr_factor(new)=$a$*ave_cr_factor(old)+(1−$a$)*cr_factor(new), where:
ave_cr_factor(new) is the current version of the average compression rate factor;
ave_cr_factor(old) is the previous version of the average compression rate factor;
cr_factor(new) is the compression rate factor of the latest cold super block; and
$a$ is a weighting factor.

5. The data storage system as claimed in claim 4, wherein:
the processor sets an initial value of the average compression rate factor based on a specified value of compression rate factor of a data compression algorithm applied to the non-volatile memory.

6. The data storage system as claimed in claim 4, wherein:
the processor sets an initial value of the average compression rate factor as a compression rate factor of a starting cold super block.

7. The data storage system as claimed in claim 4, wherein:
the processor programs key-value data to a plurality of hot super blocks and then compresses the key-value data from the hot super blocks to the cold super blocks;
the processor estimates, for each cold super block and each hot super block, an uncompressed size of valid pieces of key-value data; and
based on the uncompressed size of valid pieces of key-value data in each of the cold super blocks and the hot super blocks, the average compression rate factor, and the compression rate factor of each of the cold super blocks, the processor estimates the storage space consumption.

8. The data storage system as claimed in claim 7, wherein the processor performs a calculation:

estimate_hot_disk_usage=(valid_kv_size[$h\_1$]+ valid_kv_size[$h\_2$]+ . . . +valid_kv_size [$h\_n$])*ave_cr_factor; and estimate_cold_disk_usage=valid_kv_size[$c\_1$]* cr_factor[$c\_1$]+valid_kv_size[$c\_2$]*cr_factor [$c\_2$]+ . . . +valid_kv_size[$c\_m$]*cr_factor [$c\_m$], where:
estimate_hot_disk_usage is the first compressed size that corresponds to a hot space in the non-volatile memory which includes the hot super blocks;
h_1, h_2 . . . h_n are the hot super blocks of the non-volatile memory, and uncompressed size of valid pieces of key-value data within h_1, h_2 . . . h_n is valid_kv_size[h_1], valid_kv_size[h_2] . . . valid_kv_size[h_n];
estimate_cold_disk_usage is the second compressed size that corresponds to a cold space in the non-volatile memory which includes the cold super blocks; and c_1, c_2 ... c_m are the cold super blocks of the non-volatile memory, uncompressed size of valid pieces of key-value data within c_1, c_2 ... c_m is valid_kv_size[c_1], valid_kv_size[c_2] ... valid_kv_size[c_m], and compression rate factors of c_1, c_2 ... c_m are cr_factor[c_1], cr_factor[c_2] ... cr_factor[c_m].

9. The data storage system as claimed in claim 8, wherein the processor performs a calculation:

$$estimate\_disk\_usage = estimate\_hot\_disk\_usage + estimate\_cold\_disk\_usage,$$

where:
estimate_disk_usage is the storage space consumption.

10. The data storage system as claimed in claim 1, wherein:
the processor within the host, operates the non-volatile memory provided on the device through a controller at the device.

11. The data storage system as claimed in claim 1, wherein:
the non-volatile memory is provided within the device;
the processor is a controller within the device; and
the controller operates the non-volatile memory in response to requests issued by a host.

12. A non-volatile memory control method, comprising:
estimating an average compression rate factor of a non-volatile memory; and
estimating storage space consumption of the non-volatile memory based on the average compression rate factor and, if the storage space consumption exceeds a predefined threshold, prohibiting programming on the non-volatile memory,
wherein:
the average compression rate factor is dynamically updated, and is a weighted result of compression rate factors of several storage units of the non-volatile memory;
the non-volatile memory is a flash memory;
key-value data is compressed to a plurality of cold super blocks of the flash memory; and
for each cold super block, a compression rate factor is estimated for estimation of the average compression rate factor.

13. The non-volatile memory control method as claimed in claim 12, further comprising performing a calculation:

$$cr\_factor = total\_sb\_space / total\_kv\_size$$

where cr_factor is a compression rate factor of a cold super block, total total_sb_space is a rated capacity of the cold super block, and total_kv_size is an uncompressed size of all valid and invalid pieces of key-value data in the cold super block.

14. The non-volatile memory control method as claimed in claim 13, further comprising performing a calculation:

$$kv\_size = len(prefix) + len(key) + len(value) + len(mark)$$

where:
kv_size is an uncompressed size of a piece of key-value data;
length of a prefix recorded in the piece of key-value data is len(prefix);
length of a key recorded in the piece of key-value data is len(key);
length of a responding value recorded in the piece of key-value data is len(value); and
length of a mark recorded in the piece of key-value data is len(mark).

15. The non-volatile memory control method as claimed in claim 13, further comprising performing a calculation:

$$ave\_cr\_factor(new) = a * ave\_cr\_factor(old) + (1-a) * cr\_factor(new)$$

where:
ave_cr_factor(new) is a current version of the average compression rate factor;
ave_cr_factor(old) is a previous version of the average compression rate factor;
cr_factor(new) is a compression rate factor of a latest cold super block; and
a is a weighting factor.

16. The non-volatile memory control method as claimed in claim 15, further comprising:
setting an initial value of the average compression rate factor based on a specified value of compression rate factor of a data compression algorithm applied to the non-volatile memory.

17. The non-volatile memory control method as claimed in claim 15, further comprising:
setting an initial value of the average compression rate factor as a compression rate factor of a starting cold super block.

18. The non-volatile memory control method as claimed in claim 15, further comprising:
programming key-value data to a plurality of hot super blocks and then compressing the key-value data from the hot super blocks to the cold super blocks;
estimating, for each cold super block and each hot super block, an uncompressed size of valid pieces of key-value data; and
estimating the storage space consumption based on the uncompressed size of valid pieces of key-value data in each of the cold super blocks and the hot super blocks, the average compression rate factor, and the compression rate factor of each of the cold super blocks.

19. The non-volatile memory control method as claimed in claim 18, further comprising performing a calculation:

$$estimate\_hot\_disk\_usage = (valid\_kv\_size[h\_1] + valid\_kv\_size[h\_2] + \ldots + valid\_kv\_size[h\_n]) * ave\_cr\_factor;\ \text{and}$$

$$estimate\_cold\_disk\_usage = valid\_kv\_size[c\_1] * cr\_factor[c\_1] + valid\_kv\_size[c\_2] * cr\_factor[c\_2] + \ldots + valid\_kv\_size[c\_m] * cr\_factor[c\_m]$$

where:
estimate_hot_disk_usage is a first compressed size that corresponds to a hot space in the non-volatile memory which includes the hot super blocks;
h_1, h_2 ... h_n are the hot super blocks of the non-volatile memory, and uncompressed size of valid pieces of key-value data within h_1, h_2 ... h_n is valid_kv_size[h 1], valid_kv_size[h 2] ... valid_kv_size[h_n];
estimate_cold_disk_usage is a second compressed size that corresponds to a cold space in the non-volatile memory which includes the cold super blocks; and
c_1, c_2 ... c_m are the cold super blocks of the non-volatile memory, uncompressed size of valid pieces of key-value data within c_1, c_2 ... c_m is valid_kv_size[c_1], valid_kv_size[c 2] ... valid_kv_size[c_m], and compression rate factors of c_1, c_2 ... c_m are cr_factor[c 1], cr_factor[c 2] ... cr_factor[c_m].

20. The non-volatile memory control method as claimed in claim 19, further comprising performing a calculation:

$$estimate\_disk\_usage = estimate\_hot\_disk\_usage + estimate\_cold\_disk\_usage,$$

where estimate_disk_usage is the storage space consumption.

* * * * *